United States Patent [19]
Nimura et al.

[11] Patent Number: 6,064,941
[45] Date of Patent: May 16, 2000

[54] VEHICLE NAVIGATION APPARATUS AND STORAGE MEDIUM

[75] Inventors: Mitsuhiro Nimura; Kiyohide Kato; Yasunobu Ito, all of Anjo, Japan

[73] Assignee: Aisin AW Co., Ltd., Japan

[21] Appl. No.: 08/937,165

[22] Filed: Sep. 25, 1997

[30] Foreign Application Priority Data

Sep. 30, 1996 [JP] Japan .................................. 8-258714
Sep. 30, 1996 [JP] Japan .................................. 8-259889

[51] Int. Cl.[7] .................................................. G06F 165/00
[52] U.S. Cl. ........................ 701/210; 701/208; 701/209; 340/988; 340/990; 73/178 R
[58] Field of Search ................................ 701/200, 201, 701/202, 205, 206, 208, 209, 210; 340/988, 990, 995; 73/178 R

[56] References Cited

U.S. PATENT DOCUMENTS

| | | | |
|---|---|---|---|
| 5,587,911 | 12/1996 | Asano et al. ................................ | 701/202 |
| 5,612,881 | 3/1997 | Moroto et al. ............................ | 701/209 |
| 5,652,706 | 7/1997 | Morimoto et al. ....................... | 701/210 |
| 5,774,073 | 6/1998 | Maekawa et al. ....................... | 701/210 |
| 5,787,382 | 7/1998 | Kurabayashi .............................. | 701/25 |
| 5,787,383 | 7/1998 | Moroto et al. ............................ | 701/210 |
| 5,793,631 | 8/1998 | Ito et al. .................................... | 701/25 |
| 5,821,880 | 10/1998 | Morimoto et al. ....................... | 340/995 |

*Primary Examiner*—William A. Cuchlinski, Jr.
*Assistant Examiner*—Gertrude Arthur
*Attorney, Agent, or Firm*—Lorusso & Loud

[57] ABSTRACT

A navigation apparatus reduces route search time while providing guidance in conformity with drivers' preferences, by selectively conducting either a full-range route search or a more limited, local area search, in accordance with detected conditions and responsive to occurrence of an off-route event. For example, the full-range route search is conducted pursuant to a determination that the vehicle has gone straight at a predetermined number of certain intersections where current guidance has directed a turn.

12 Claims, 15 Drawing Sheets

(A) GUIDANCE ROAD DATA

| ROAD NUMBER (n) | | |
|---|---|---|
| 1 | ROAD NO. | |
| | LENGTH | |
| | ROAD ATTRIBUTE DATA | |
| | SHAPE DATA ADDRESS/SIZE | |
| | GUIDANCE DATA ADDRESS/SIZE | |
| | ⋮ | |
| n | | |

(B) SHAPE DATA

| NODE NUMBER (m) | |
|---|---|
| 1 | EAST LONGITUDE |
| | NORTH LATITUDE |
| ⋮ | |
| m | |

(C) GUIDANCE DATA

| INTERSECTION NAME |
|---|
| CAUTION DATA |
| ROAD NAME DATA |
| ROAD NAME VOICE DATA ADDRESS/SIZE |
| COURSE DATA ADDRESS/SIZE |

(D) COURSE DATA

| COURSE NUMBER (k) | |
|---|---|
| 1 | COURSE ROAD NUMBER |
| | COURSE NAME |
| | COURSE NAME VOICE DATA ADDRESS/SIZE |
| | COURSE DIRECTION DATA |
| | TRAVEL GUIDANCE DATA |
| | ⋮ |
| k | |

(E) COURSE DIRECTION DATA

-1: INVALID
 0: UNNECESSARY
 1: GO STRAIGHT
 2: RIGHT DIRECTION
 3: DIAGONALLY RIGHT DIRECTION
 4: BACK-TO-RIGHT DIRECTION
 5: LEFT DIRECTION
 6: DIAGONALLY LEFT DIRECTION
 7: BACK-TO-LEFT DIRECTION

PRESENCE/ABSENCE OF INFORMATION
PRESENT: O

ROAD ATTRIBUTE DATA

| | | |
|---|---|---|
| ELEVATED TRACK/SUBWAY ROAD DATA | ELEVATED TRACK | |
| | BESIDE ELEVATED TRACK | |
| | SUBWAY ROAD | O |
| | BESIDE SUBWAY ROAD | |
| LANE NO. | 3 LANES OR MORE | |
| | 2 LANES | O |
| | 1 LANE | |
| | NO CENTERLINE | |

FIG. 3(B)

ROAD NAME DATA

| ROAD TYPE | INTERTYPE NO. |
|---|---|

| | | |
|---|---|---|
| HIGHWAY | MAIN | 1 |
| | ACCESS | 2 |
| CITY SPEEDWAY | MAIN | 3 |
| | ACCESS | 4 |
| TOLL ROAD | MAIN | 5 |
| | ACCESS | 6 |
| PUBLIC ROAD { NATIONAL ROAD | | 7 |
| STATE ROAD | | 8 |
| OTHERS | | 9 |

FIG. 4(A)

CAUTION DATA

| RAILROAD CROSSING | O |
|---|---|
| TUNNEL ENTRANCE | |
| TUNNEL EXIT | |
| WIDTH REDUCTION POINT | |
| NONE | |

FIG. 4(B)

TRAVEL GUIDANCE DATA

| NEAR RIGHT | |
|---|---|
| NEAR LEFT | |
| NEAR CENTER | O |
| NONE | |

FIG. 5

(a) LANDMARK DATA

| | LANDMARK NUMBER (n) | |
|---|---|---|
| 1 | NO. | |
| | COORDINATES (EAST LONGITUDE, NORTH LATITUDE) | |
| | NAME | |
| | PHONE NUMBER | |
| | ⋮ | |
| n | | |

(b) LANDMARK DATA

| 1 | ⊕ |
|---|---|
| 2 | ☼ |
| 3 | ♣ |
| 4 | ♠ |
| ⋮ | ⋮ |

FIG. 8
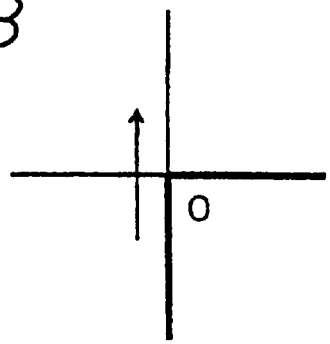
FIG. 9
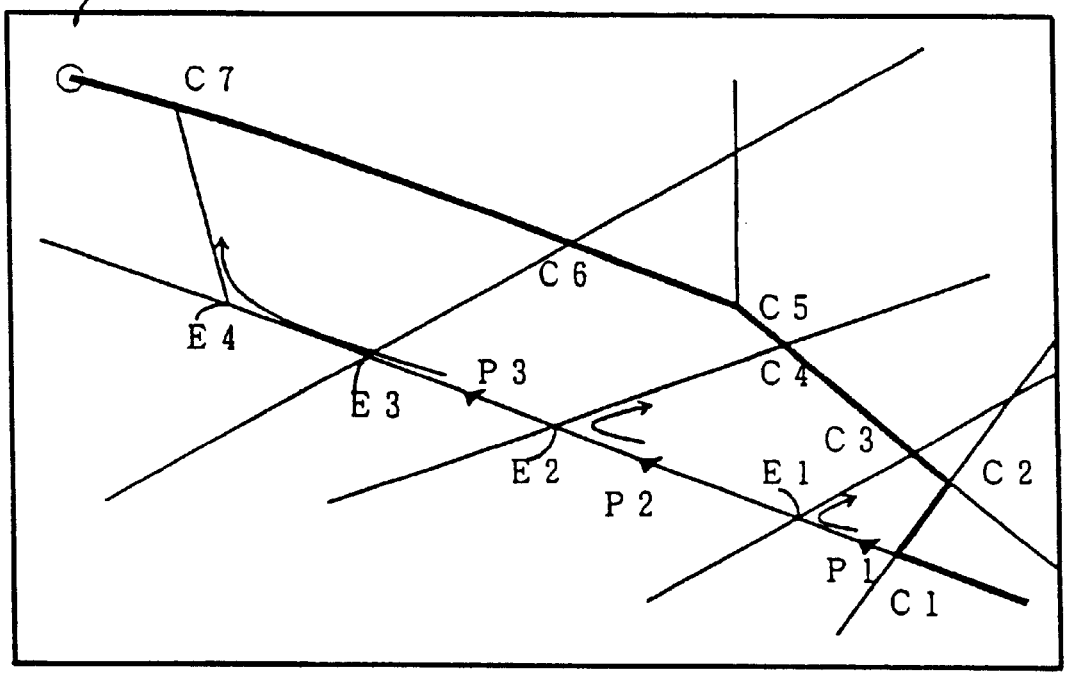
FIG. 10

| REDUCED SCALE | UPPER LIMIT VALUE |
|---|---|
| 1/500 | 110 |
| 1/1000 | 100 |
| 1/5000 | 80 |
| ⋮ | |
| 1/100000 | 50 |

FIG. 22(a)

| VEHICLE SPEED (km/hr) | UPPER LIMIT VALUE |
|---|---|
| 0 | 100 |
| 0~30 | 90 |
| 30~50 | 80 |
| 50~70 | 70 |
| 70~80 | 60 |
| 80~100 | 50 |
| 100 | 40 |

FIG. 22(b)

| VEHICLE TRAVEL DIRECTION | DISPLAY RATIO |
|---|---|
| AREA AHEAD | 70% |
| AREA TO THE RIGHT/LEFT | 20% |
| REAR AREA | 10% |

FIG. 22(c)

VEHICLE NAVIGATION APPARATUS AND STORAGE MEDIUM

BACKGROUND OF THE INVENTION

1. Field of the Invention

The present invention relates generally to vehicle navigation apparatus and, more particularly, to automatic re-search used when the vehicle strays from a predetermined route.

2. Prior Art

Conventional vehicle navigation systems are designed to search map and road data to determine an optional or "guidance route" to a destination, responsive to input of a destination, a pass-through location, a stop-over point and the like, and to provide guidance along the determined guidance route. Generally, such systems include a function for renewed automatic searching or "re-searching" responsive to determination that the vehicle has deviated from the guidance route. In the automatic researching mode, when it is detected that the present vehicle location is off of the guidance route, a search is made either (1) to determine an entire new route extending all the way to the destination or, alternatively, (2) to determine a route returning to the original guidance route by a search of road information limited to an area near or around the present position.

The first type search, i.e. for an entire new route to the destination, when the vehicle departs from the guidance route, requires much time to complete. In order to reduce the search time, some conventional systems are designed to conduct the second type search, i.e. for a route returning at the original route limited to road information for the nearby area around the present vehicle location. However, this latter system is more likely to settle on a route at odds with the drivers' intentions and/or preferences or on a route requiring travel a long distance out of the way, because of the fact that it seeks a return to the original route.

Conventional vehicle navigation apparatus permits input of a destination, pass-through point, facility to see, and the like, searches for a guidance route to a destination, and outputs guidance during travel along the route determined by the search. Typically, such apparatus displays on a guidance screen marks representing facilities (landmarks) such as gas stations, banks, convenience stores, and the like. Another navigation apparatus which has been proposed is capable of offering selectivity with respect to landmarks to be displayed on the guidance screen. For example, such a navigation apparatus may be designed so that in cases where an immediate stop at a nearby gas station is required due to shortage of vehicle fuel, it displays marks representative of gas stations thereby enabling a vehicle driver to find the nearest gas station. In displaying such landmarks by the prior art navigation apparatus, there has been the problem that where a great number of facilities are present as landmarks within an area being displayed on the guidance screen, if these are displayed automatically, the original map on which such landmarks are superimposed becomes difficult to see.

SUMMARY OF THE INVENTION

Accordingly, the present invention seeks to avoid the problems associated with the prior art, and its primary object is to provide a vehicle navigation apparatus capable of reducing time required for a route search while providing acceptable guidance which satisfies the drivers' preferences, by selectively conducting either a route search for the entire route to the destination or a search limited to the nearby area, as dictated by satisfaction of predetermined conditions, responsive to a determination or detection of departure of the vehicle from a predetermined route.

To overcome the foregoing problems associated with the prior art systems, the present invention provides a vehicle navigation apparatus including search means for predetermining a route from a starting location or detected present position to a destination and off-route recognition means for recognizing a departure from the predetermined route. Responsive to a determination of a departure from the predetermined route, a selecting means operates to select between a re-search in either a first mode or a second mode. In the first mode, a limited search is conducted based on road data limited to an area closely surrounding the detected present position of the vehicle for the purpose of determining a return route to the original, i.e. predetermined, route. In the second mode, the re-search is conducted in road data for a wide area, wider than the limited area searched in the first mode and extending from the detected present position to the destination, to determine a new route from the detected present position to the destination. Re-search means then conducts a re-search in the selected mode. Guidance means, e.g. a display screen and/or speaker, outputs guidance in accordance with either the predetermined route, the return route or the new route.

The apparatus will further include conventional vehicle position detection means such as a GPS receiver.

In preferred embodiments, the vehicle navigation apparatus will also include off-route criterion judgement means for judging whether or not the recognized departure satisfies some criterion. In one embodiment, the criterion relates to the type of road the vehicle is travelling upon departure from the predetermined route. In another embodiment, the criterion will be a predetermined number of deviations from the current guidance, usually the guidance for the return route. A re-search in the aforementioned second mode is conducted responsive to a judgement that the criterion has been satisfied. More specifically, in the latter embodiment the deviations may be passage through certain intersections, in succession, in a manner contrary to the directions given in guidance for the return route. For example, the criterion may be judged to be satisfied where the vehicle passes straight through certain intersections, in succession, contrary to guidance instructions to turn at those certain intersections.

In a preferred embodiment the second route search mode is selected when it is determined that the vehicle has left the determined route and is currently travelling on a specific type of road. In another preferred embodiment the second mode is selected responsive to a predefined number of events occurring in continuous succession.

The present invention also relates to a storage medium having encoded thereon a program for execution of a routine including searching to establish a predetermined route from a starting location or present position to a destination, recognizing a departure of the vehicle from the predetermined route and, responsive to recognition of such a departure, selecting a re-search in the aforementioned first mode or a re-search in the aforementioned second mode. Of course, as noted above, the routine may further include judging whether or not the vehicle has gone straight through a predetermined number of intersections contrary to guidance instructing a turn at those intersections and selection of a second mode responsive in accordance with a positive judgement. In another embodiment the routine would include judging the type of road travelled by the vehicle in its detected present position judged to be a departure from the predetermined route.

BRIEF DESCRIPTION OF THE DRAWINGS

In the drawings:

FIG. 2 is a diagram of one exemplary configuration of major data files in accordance with the invention;

FIGS. 3A and 3B are diagrams showing an exemplary configuration of additional major data files in accordance with the invention;

FIGS. 4A and 4B are diagrams showing one exemplary configuration of more major data files in accordance with the invention;

FIG. 5 is a diagram of a landmark data file;

FIG. 8 is a diagram illustrating a vehicle passing straight through an intersection where a turn should have been made;

FIG. 9 is a table of possible values for predetermined number n;

FIG. 10 is a diagram illustrating operation of a re-search routine in accordance with the present invention;

FIGS. 22A, 22B and 22C are lower limit value tables for use in the landmark display subroutines.

DESCRIPTION OF THE PREFERRED EMBODIMENTS

Figure 1A:
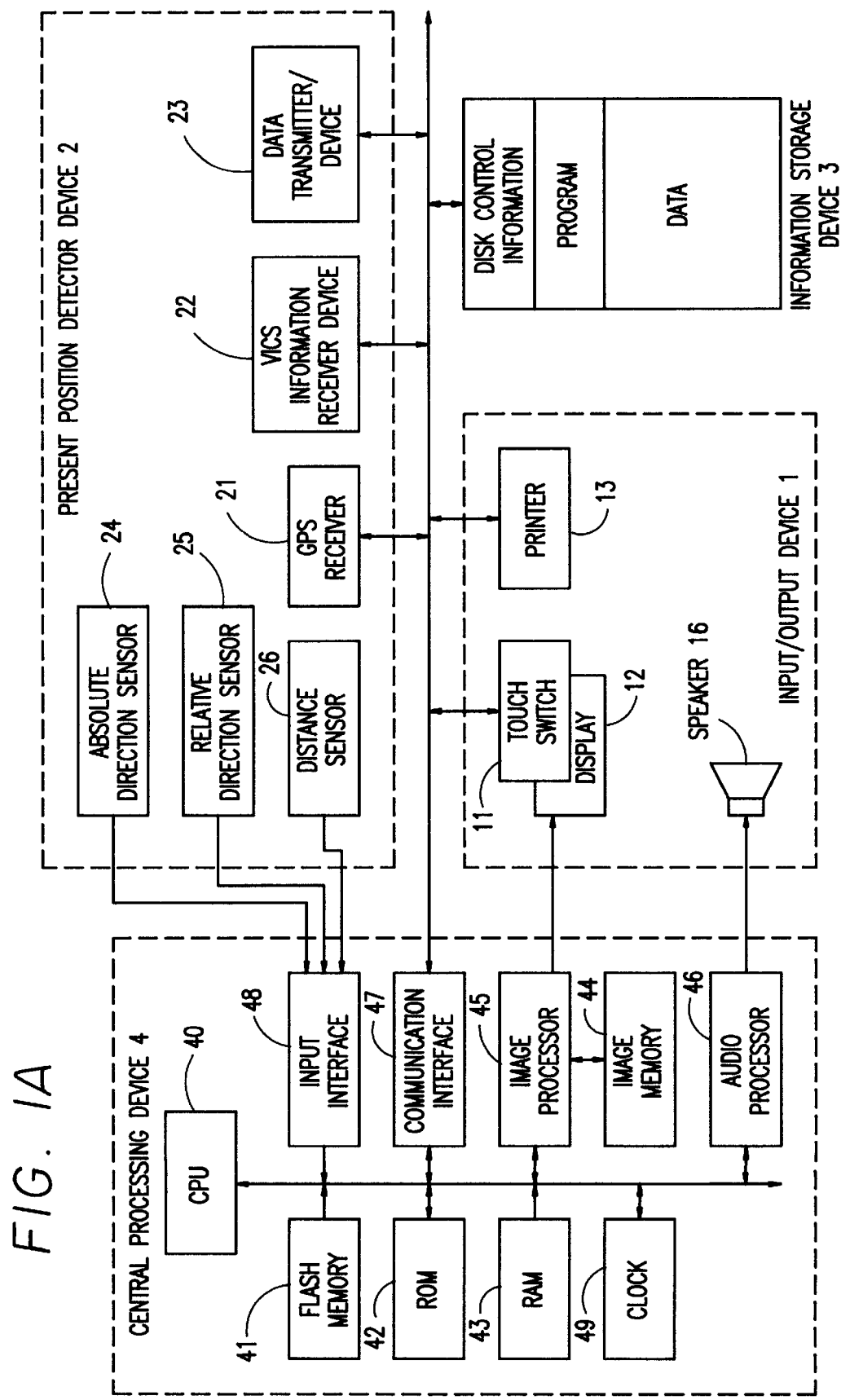
FIG. 1A is a block diagram of one embodiment of the vehicle navigation apparatus of the present invention.

FIG. 1A is a diagram showing a first embodiment of the vehicle navigation apparatus. As shown in FIG. 1A, the vehicle navigation apparatus of this first embodiment includes an input/output device 1 for inputting and outputting information as to route guidance, a present position detection device 2 for detecting information indicative of the present position of the vehicle carrying the apparatus, an information storage device 3 which stores therein navigation data as required for calculation of routes, display/audio guidance data as necessary for route guidance, programs (applications and/or OS) and the like, and a central processing device 4 which executes display/audio guidance routines and route search routines and which also provides control over the entire system.

Figure 1B:
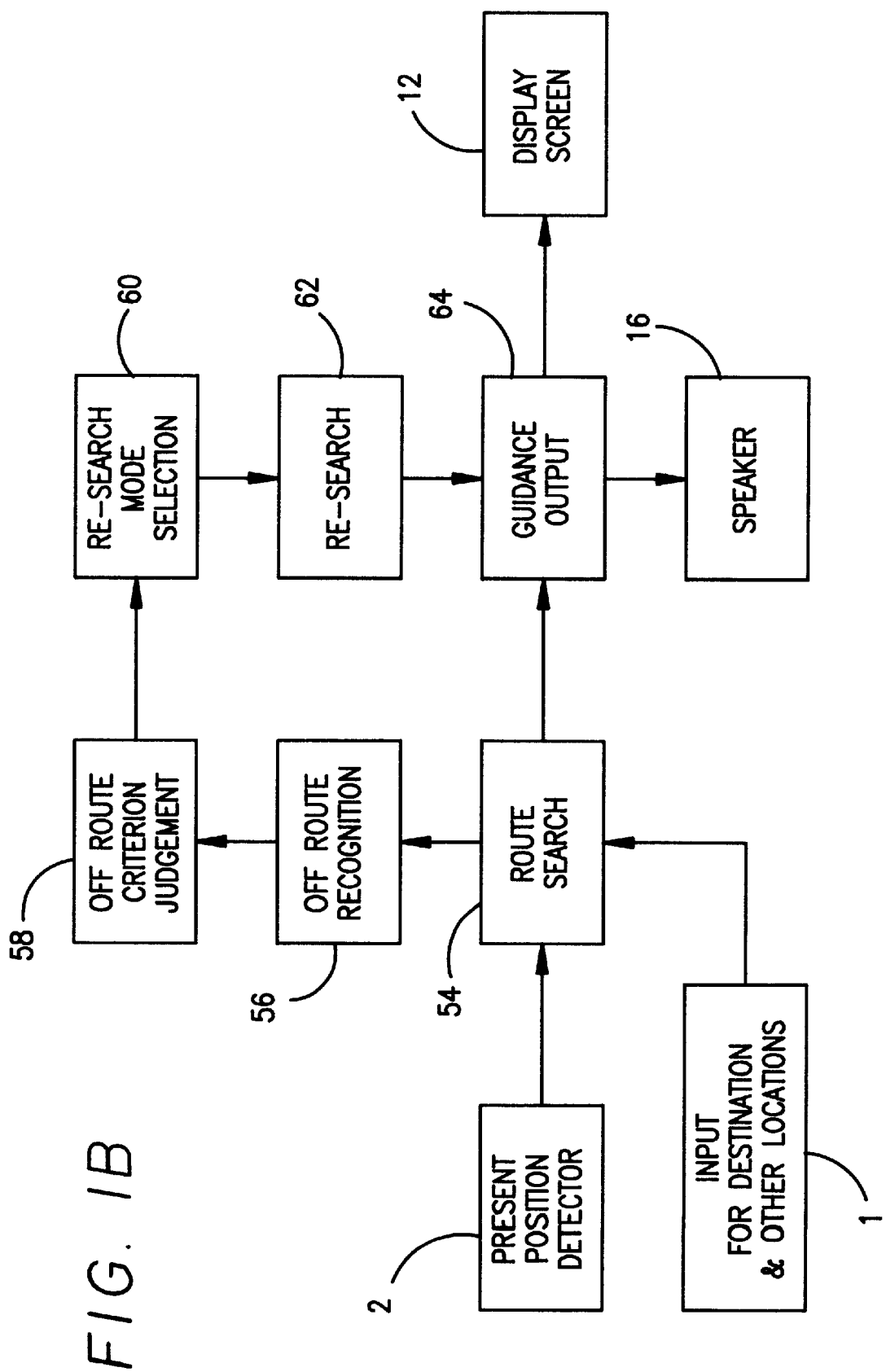
FIG. 1B illustrates the present invention in another block diagram form.

As shown in FIG. 1B the present invention also includes route search means 54 which preforms a route search to determine an optimum route from the starting location or detected present position to the destination. Means for off-route recognition 56 detects a departure of the vehicle from the route determined by route search means 54, i.e. the "original" or "predetermined" route. An off-route criterion judgement means 58 is optionally included for the purpose of determining whether the departure from the route detected by off-route recognition means 56 has been intentional on the part of the driver. Off-route criterion judgement means makes such a determination on the basis of a suitable criterion, such as the type of road currently driven by the vehicle or the number of vehicle movements, e.g. at certain intersections, contrary to current guidance. Re-search mode selection means 60 instructs re-search means 62 to conduct a re-search in either a first mode or a second mode. In the first mode the re-search means 62 searches road data for a limited area close to and surrounding the detected present vehicle position for the purpose of determining a return route with guidance directing the vehicle for return to the original route. In the second mode, the re-search means 62 conducts a search of a greater amount of data covering a wider area, an area extending from the detected present position to the destination, for the purpose of determining a new optimum route to the destination. Guidance output means 64 operates to generate guidance messages for travel on one of the original route, the return route, and the new optimal route.

The input/output device 1 instructs navigation routines to the central processing device 4 in conformity with the driver's intentions, prints out processed data, provides for input of a target place or destination and outputs guidance information via audio and/or display as required by the driver. As means for providing attaining such functions, its input section has a touch switch 11 and operation switches for input of a destination based on the telephone number or map coordinates, as well as for request of route guidance. Obviously, the input section may alternatively be an input device such as a remote controller or the like. In addition, an output section includes a display unit 12 which displays input data and also automatically displays route guidance as graphics images on the screen, responsive to a request from the driver, a printer 13 which prints the data as processed by the central processing device 4 and data as stored in the information storage device 3, and a speaker 16 for output of resultant route guidance by voice.

The apparatus may further include a voice recognition device for enabling voice input and a record card reader device for reading data recorded on IC cards or magnetic cards. Further, a data communication device may be utilized for data communications between the navigation apparatus and certain information sources such as a remote information center for storing therein data necessary for navigation and for providing information via communication lines responsive to the driver's requests. An electronic personal information management tool may be used for prestoring a driver's specific data such as map data, destination data and the like.

The display unit 12 is a color CRT or color liquid crystal display panel, for color-display output of all the screens necessary for navigation, including a route setting screen, block segment drawing screen, traffic intersection drawing screen and the like, based on map data and guidance data processed by the central processing device 4. The display unit 12 further displays buttons on the screen for use in setting route guidance and in changing guidance and screens during route guidance. Especially, intersection information such as the name or title of an intersection to be passed through will be color-displayed on the route-segment drawing screen in a pop-up manner at any time, as required.

Display unit 12 is mounted within an instrumental panel near the driver's sheet, thus enabling the driver to confirm the present location of his or her vehicle by viewing a route-segment drawing, while acquiring information as to the route ahead. The display 12 is also provided with a touch switch 11, corresponding to the display of function buttons, and thus provides for the aforesaid operations which are effectuated by input of a signal through touch of an appropriate button. An input signal generator means, including this button, the touch switch and the like, constitutes the input section.

The present position detection means 2 may be: a GPS receiver 21 for acquiring information from the satellite global positioning system (GPS) for vehicles; a VICS information receiver 22 for acquiring information by FM multiplex broadcasts, radio wave beacons, optical beacons, and the like; a data transmitter/receiver 23 for bidirectionally communicating—by use of a mobile telephone set, personal computer, or the like—information with an information center (ATIS, for example) and with other vehicles; an absolute direction sensor 24 for detecting the travelling direction of the vehicle as an absolute direction by utilizing geomagnetism; a relative direction sensor 25 for detection of the travelling direction of the vehicle as a relative direction by use of, for example, a steering sensor or gyro sensor; and/or a distance sensor 26 for detection of the travelled distance of the vehicle from the number of rotations of a shaft, for example. Thus, the present position detection means 2 operates to transmit and/or receive, for example, road information and traffic information that are information concerning the vehicle's travel and to detect information as to the present vehicle position and further to transmit/receive information as to the present position.

The information storage device 3 is an external storage device which stores therein programs and data for navigation, and may be, by way of example, a CD-ROM. The programs may include a program for use in executing routines such as route search, automatic re-search (peripheral or "nearby-area" route search, entire or "full-range" route search) and the like, programs for executing routines as will be described later with reference to a flowchart in connection with a preferred embodiment, a program for execution of display output control required for route guidance and voice output control as required for voice guidance, as well as associated data, and display information data required for both route guidance and map display. The stored data may include all data necessary for operation of the navigation apparatus, inclusive of data files such as map data, search data, guidance data, map-matching data, destination data, registered location data, road data, genre-dependent data, and the like. Note here that the present invention may also be applied to a navigator of the type designed to employ CD-ROMs for all data storage, with the programs being separately stored in the central processing device 4.

The central processing device 4 includes a CPU 40 for performing a variety of arithmetic routines, a flash memory 41 for reading programs out of the CD-ROM of the information storage device 3 and storing the same therein, a ROM 42 for storage of a program for executing program-check and update programs of the flash memory 41 (program read-in means) and a RAM 43 for temporarily storing therein route guidance information located by search, such as the point coordinates of a presently set destination, road name code number and the like, along with the data currently being subjected to arithmetic processing. The central processing unit 4 is shown in FIG. 1 as further including an image memory 44 for storage of image data to be used for screen display, an image processor 45 which retrieves data from the image memory 44 responsive to a display output control signal from the CPU 40 and processes the retrieved image data to output the display. An audio processor 46 synthesizes an audible voice, phrase, sentence with a single message, sound or the like from data read from the information storage device 3 responsive to an audible output control signal from the CPU 40. Audio processor 40 first produces a synthesized signal and converts that signal into an analog signal which is output to the speaker 16. A communication interface 47 handles input and output of data over communication channels and a sensor input interface 48 receives sensor signals from the present position detection device 2. A clock 49 writes date and time into internal dialog information. The apparatus is capable of providing route guidance by both screen display output and audible output, while allowing the driver to selectively obtain either or both types of output.

The program for performing update processing may alternatively be stored in an external storage device.

All of the programs in accordance with the present invention, as well as the other programs required for performing navigation may be stored in the CD-ROM which is one external storage medium. Alternatively, part or all of such programs may be stored in the ROM 42 in the main body of the apparatus, i.e. central processing device 4.

A variety of navigation functions may be attained by arithmetic procedures, wherein the data and programs stored in this external storage medium are input as external signals to the central processing device 4 within the main body of the navigation apparatus.

The navigation apparatus of the present invention includes a relatively large capacity flash memory 41 for reading certain program(s) out of the CD-ROM, an external storage device as described previously, and a small capacity ROM 42 which prestores therein a program (program read-in means) for start-up processing of a CD. The flash memory 41 is a memory which continues to retain therein once-stored information after interruption of power supply thereto. In other words, a flash memory 41 is a nonvolatile memory means. Flash memory 41 performs CD start-up processing by starting a certain program of the ROM 42, acting as the program read-in means, to check the program stored in the flash memory 41, while reading disk control information and the like off of the CD-ROM of the information storage device 3. The program load processing (update processing) is done by judgment based on this information and the status of the flash memory 41.

FIGS. 2 to 4 show an exemplary configuration of major data files as stored in the information storage device 3 shown in FIG. 1A. FIG. 2(A) shows a guidance road data file which stores therein data items necessary for calculating a route or routes by the route calculation means and for providing route guidance. The data stored in a guidance road data file may consist of, for each of n number roads, a road number, length, road attribute data, shape data address/size, and guidance data address/size. A road number is independently set for each direction (outbound and return) and for each road segment between adjacent branch points. As shown in FIG. 3(A), road attribute data used as road guidance auxiliary information data is the data which indicates, for example, whether a road of interest is an elevated road, a side access to such an elevated road, a below grade (sunken) road or tunnel, or a side access to the below grade road, along with information as to the number of lanes. As shown in FIG. 2(B), when each road is subdivided into segments by a plurality of nodes, the shape data includes coordinate data consisting of the east longitude and north latitude for each of m number nodes.

As shown in FIG. 2(C), the guidance data may consist of an intersection (or branch point) name, caution data, road name data, road name voice data address/size, and course data address/size. As shown in FIG. 4(A), the caution data is data for indication of, for example, that the present vehicle location is approaching a railroad crossing, an intersection, tunnel entrance, tunnel exit, or lane merge point, for example. Thus, caution data is used to alert the driver to approach of the vehicle locations requiring special caution. As shown in FIG. 3(B), the road name data is the data which identifies the road type as an interstate highway, city freeway, toll road or ordinary public road (federal road, state road, or other) as well as information as to whether the vehicle is presently on a main lane or access road with respect to an interstate highway, city freeway, or toll road. The information may be incorporated into the road type data in combination with a subsidiary or inter-type number indicative of individual number data within each road type.

As shown in FIG. 2(D), course data may consist of a course road number, course name or title, course name voice data address/size, course direction data, and travel guidance data. The course name also includes a district name. The course direction data may indicate invalidity (use cannot be made of the course direction data), lack of guidance, and may further include information messages such as go-straight, turn right, bear diagonally to the right, back-to-the-right direction, turn left, bear diagonally to the left, and back-to-the-left direction. As shown in FIG. 4(B), the travel guidance data file may include data items for use in providing guidance as to which lane is to be selected for a travel where the road has a plurality of lanes; this data may specify whether the proper lane is the near right, near left or near center lane.

FIGS. 5(A) and 5(B) show a file of landmark data. As shown in FIG. 5(a), for each landmark, the landmark data may include a number, coordinates (east longitude, north latitude), title or name, and phone number, thus permitting registration of patterns of landmarks for use in actual display on a map, in numerical sequence, as shown in FIG. 5(b).

Figure 6:
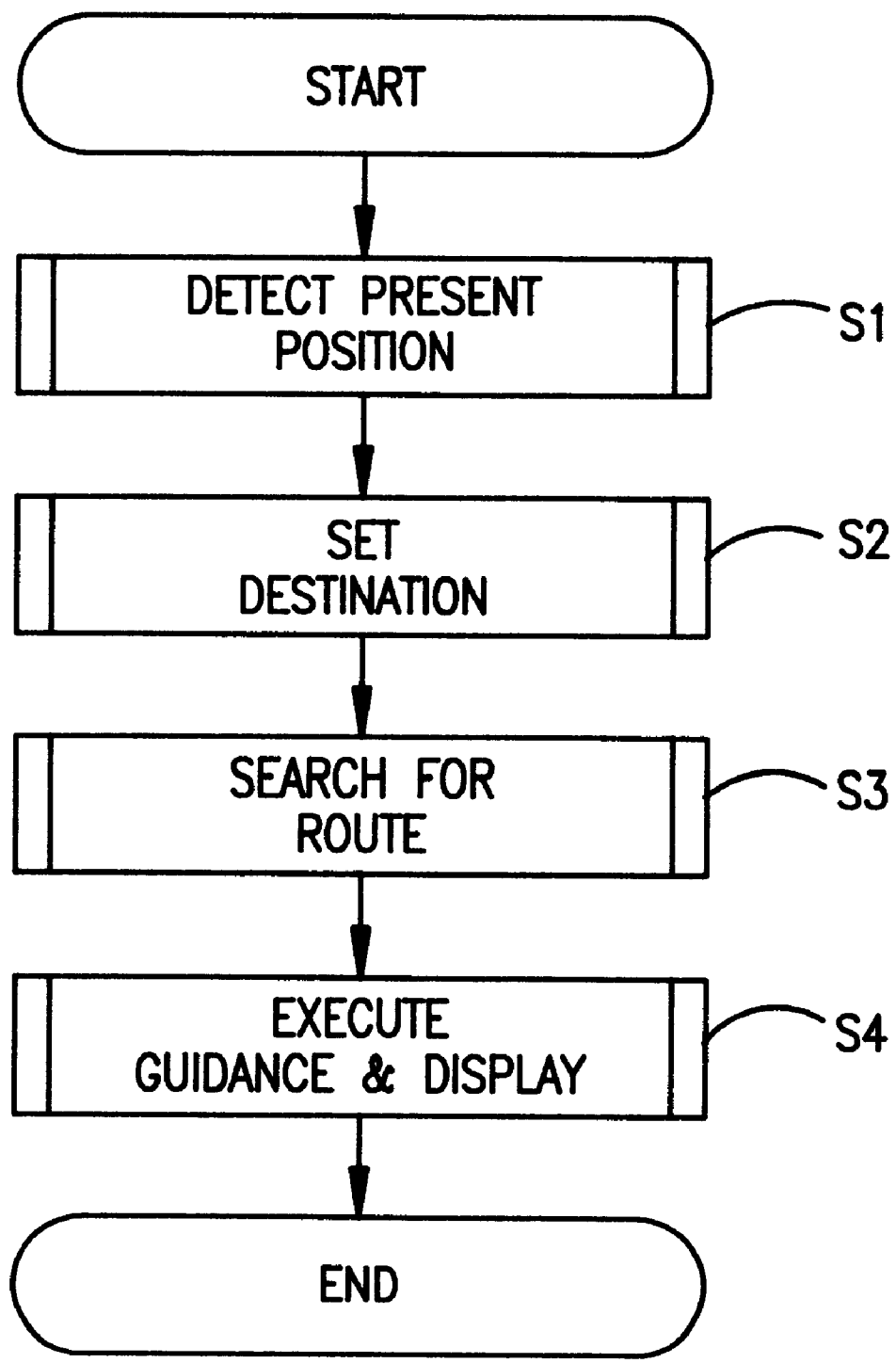
FIG. 6 is a flow chart of a main routine for operation of the vehicle navigation apparatus in accordance with the invention.

FIG. 6 is a flow chart of the main routine for operation of the navigation apparatus in accordance with the invention. When a program(s) is/are read out of the information storage device 3 into the CPU 40 of the central processing device 4, the program for route guidance is started. The present position detection device 2 detects the present location for the purpose of displaying an area map covering the immediate vicinity with the detected present location at its center while simultaneously displaying the name of the present location, genre landmarks as set and others (step S1). Next, a destination is set by input of a target name such as a place name, facility name or the like, telephone number, administrative address, registered point, road name or the like (step S2). A route search is then performed covering a range from the present position to the destination (step S3). Once the route is determined, route guidance and display will be recurrently provided until the vehicle actually arrives at the destination, while the present position detection device 2 continues to track the present position loci (step S4). In a case where a temporary stop is set before arriving at the destination, a search area is set to perform a search again within such search area for output of similar route guidance iteratively until the vehicle's arrival at the destination. When the tracking of the present position detects occurrence of a departure from the determined route, a full search is again made for the entire area from the present location to the destination as set in step S2; or, alternatively, the search area is updated for execution of a re-search with an intersection on the guidance route in the nearby area around the present location being set as a destination.

Next, the automatic re-search routine of the invention will be explained with reference to FIGS. 7–9.

Figure 7:
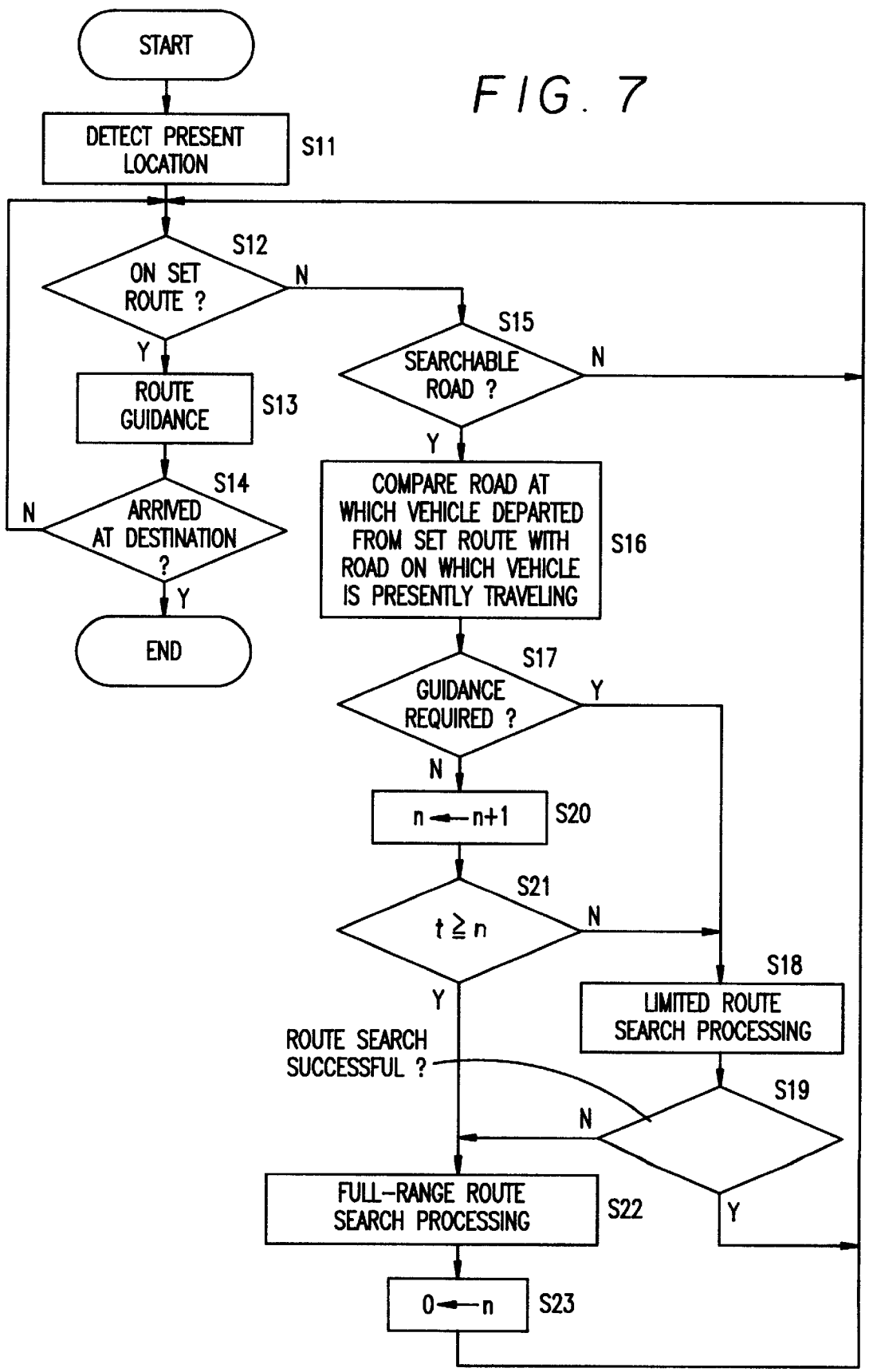
FIG. 7 is a flow chart of an example of a search routine utilized in the present invention.

FIG. 7 is a flow chart of the routine to be performed after determination of a route to a destination and during travel along this determined route. A present location is detected (step 11) and then a judgement is made as to whether or not the loci of the detected present location is on the determined route (step 12). Route guidance is continued if the detected present location is judged to be on the determined route (step 13), and this guidance is continued until the vehicle actually arrives at the destination (step 14). On the other hand, if the vehicle is judged to be off of the determined route (step 12N), judgement is made as to whether or not the detected present location is on a search-executable road, i.e. a road for which guidance data is available beyond mere map data (for depiction on a map) (step 15). Typically, a narrow back street, parking area or the like will not be a search-executable road. If the present location is judged not to be on such a search-executable road (step 15N) then it will be necessary for the vehicle to travel until it encounters a search-executable road, street or path. If it is on a search-executable road (step 15Y) then judgement is made as to whether or not guidance is necessary or not by comparison of the road where the vehicle departed from the route with the road along which the vehicle is presently travelling (step 16, step 17).

In step 16 and step 17 shown in FIG. 8, by way of example, where the guidance route would have the vehicle turn to the right (see fat line in the drawing) at an intersection O, guidance is to be judged to be unnecessary when the vehicle goes straight ahead in passing through intersection O (see the arrow in the diagram) by interpreting this departure from the determined route to be in accordance with the driver's intention. In other words, it is judged, by comparing the road along which the vehicle is presently running with a route extending through the intersection O, that no guidance is necessary, notwithstanding detection of the vehicle travelling straight through the intersection instead of turning.

Where guidance is judged to be necessary at step 17 (step 17Y), a search area is set limited to a nearby area around the present location with an intersection on the original route being set as a destination (step 18); if such a limited route search is successful (step 19Y), the vehicle is guided for travel along a route returning to the original route (fat line), and the steps following step 12 are repeated.

Where no guidance is judged to be necessary at step 17, in other words, when the vehicle behaves by going straight through the intersection where a turn was to be made in accordance with the predetermined route a counter increases its count by one. Then, a judgement is made as to whether or not the totalized value of the counter is greater than or equal to a predefined number n; if the total count is less than the predefined number n then a peripheral or local search for return to the original route is made. If the total count is greater than or equal to the predefined number n then a full-range route search covering the entire area between the present location and the destination is made without regard for the original predetermined route, and the counter value is reset to zero. The foregoing control scheme is provided by the present invention because passage through a single intersection in a manner contrary to the predetermined route indicates a possibility of a driver's mistake in merely forgetting to turn. In view of this possibility, the apparatus is so designed as to effectuate the full-range route search by judging that the driver has no intention to return to the original route when the vehicle continues going straight through a plurality of intersections in a manner inconsistent with an intent to return to the originally determined route.

The predefined number n which is used as a judgment criterion in deciding whether or not the full-range route search is to be executed may be set, on a case by case basis, to be 1, 2, 3 . . . 10 as shown in a table of FIG. 9, by way of example. If n=1 then a full-range route search will be carried out immediately when the vehicle, for example, goes straight through a single intersection where adherence to the guidance route dictated a turn. On the other hand, if n=10 then a full-range route search will be performed first only after the vehicle has passed straight through a series of ten intersections where a turn would be required for return to the originally determined route. Typically, n=3 to 5 should be adequate for this selection. The description of FIG. 10 which follows has n=3 as shown in FIG. 9—that is, an exemplary case wherein it is judged that the driver has no specific intention to return to the originally determined route only after his or her vehicle has traveled straight through three successive intersections where a turn was directed by current (first mode) guidance for return to the originally determined route.

As shown by fat line in FIG. 10, where a guidance route (originally determined route) is a route which extends through intersections C1, C2, C3, C4, C5, C6 and C7, in this order, to reach a destination D, when the vehicle does not turn to the right at the intersection C1 and continues going straight, and if its present location is at a point P1, the counter total becomes +1; however, since the count total is less than 3, a limited route search of the nearby area is conducted (first mode) for return to the original route, as designated by the fat line. The return route determined by this search provides guidance for turning to the right at an intersection E1 and, if the vehicle passes straight through this intersection E1, then the count is increased by "1" to provide a total count of "2". At this time, since the count value is still less than 3, a search limited to the nearby vicinity (first mode), for return to the original route, is performed at location P2. This latter search results in a route with guidance for turning to the right at the intersection E2 and, if once again the vehicle passes straight through this intersection E2, then the count value is increased to "3." With the total count at "3", at the position P3, a full-range route search (second mode) is conducted since it is judged that the driver has no intention to return to the original route.

Figure 11:
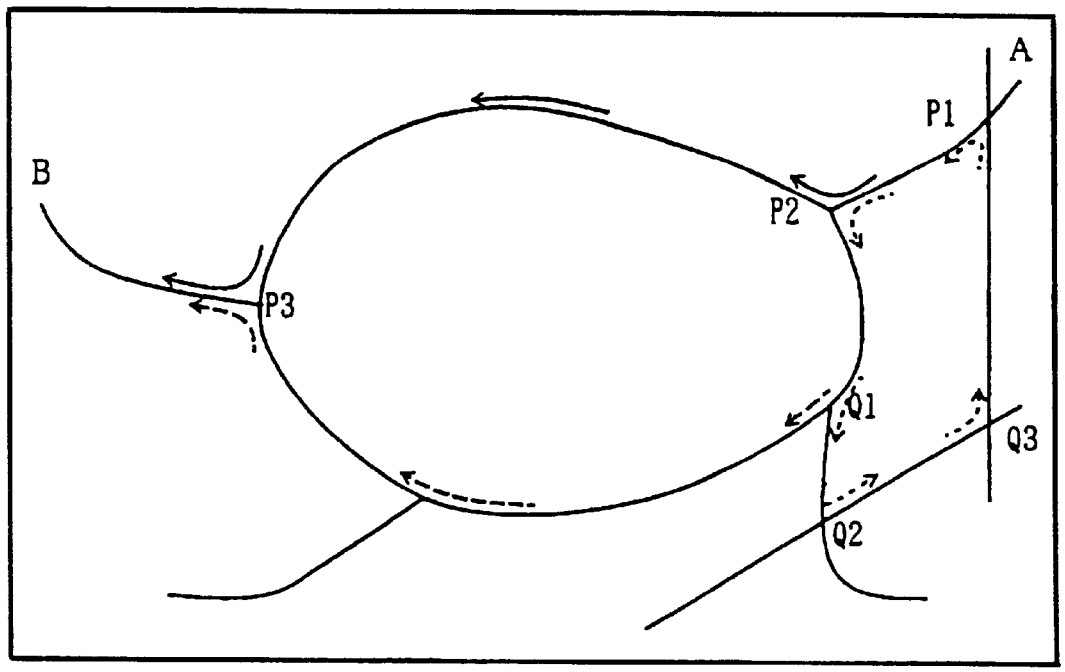
FIG. 11 is a diagram illustrating an off-route event in travelling a beltway.

FIG. 11 illustrates an embodiment in which either the limited route search (first mode) or the full-range route search (second mode) is selected in accordance with the type of road the vehicle is on after leaving the predetermined route, with the full-range route search selected when it is judged that the road type is a beltway (loop-like road), toll-road, or the like.

In the guidance route (solid arrows in FIG. 11) which extends from A to enter a traffic loop, such as a city beltway, at a branch point P2 and which then exits the beltway at a branch point P3 to proceed toward B, if the vehicle erroneously turns in the opposite direction at the branch point P2 as indicated by broken line arrow, a limited route search is conducted (near-by area route search) to determine a correcting route for return to the branch point P1 with exit from the beltway at branch point Q1 and left turns at branch point Q2 and branch point Q3. However, in the case of such a beltway, it should be understood that if the vehicle does not exit at the branch point Q1 and, instead, continues to travel along the beltway as indicated by the dotted line, then it would arrive at a branch point P3; if it keeps running straightforward without exiting at the branch point Q1, then it is judged that the driver has intentionally caused such an off-route event, thus permitting effectuation of the full-range route search. Such guidance is not limited to beltways but, rather, is also operable for highways, roads and streets which have apparently distinguishable entrance and exit points, such as toll roads and rural roads where, on occasion, a full-range search for a route to a destination will give better results than the limited search for returning to the original route, responsive to occurrence of an off-route event. Accordingly, it is possible to provide better guidance by judging whether the type of road driven after deviation from the original route (occurrence of an off-route event) is one of specified type, such as beltway, toll road or the like, and then determining whether or not to conduct a full-range route search, in accordance with that judgment.

Figure 12:
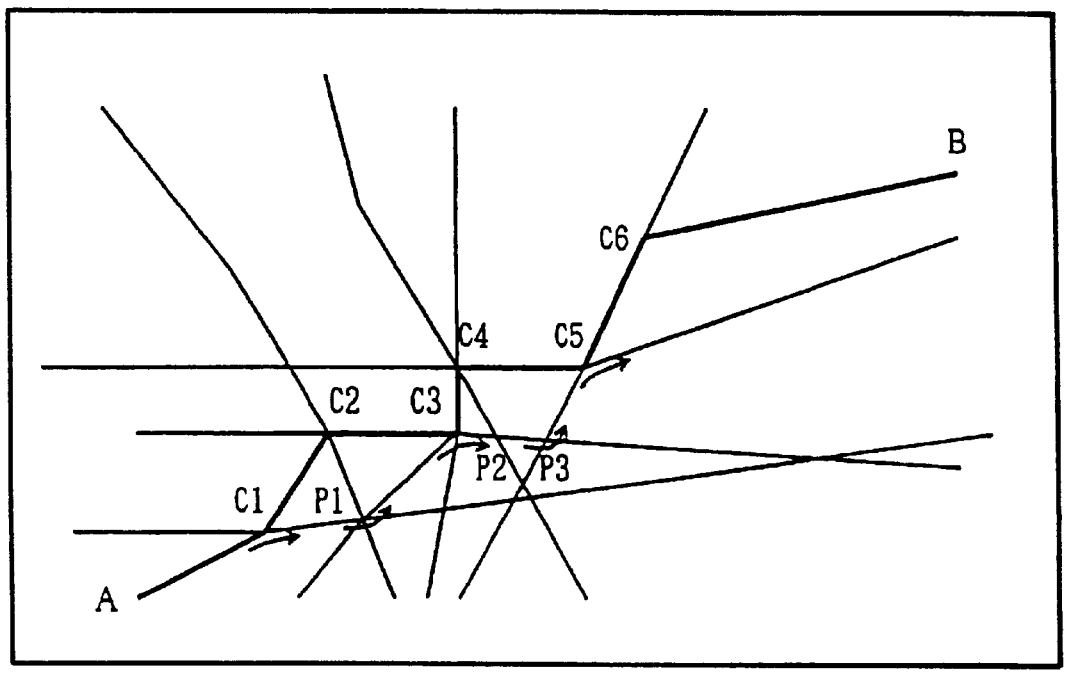
FIG. 12 is a diagram illustrating a sequence of off-route events.

FIG. 12 illustrates a case where a predetermined (original) route (solid, heavy line) extends from A through the intersections C1, C2, C3, C4, C5 and C6 toward B. In this example it is assumed that the vehicle departs from the predetermined route at intersection C1 by turning to the right, as indicated by the arrow, and toward intersection P1 and continues to the intersection C3, while ignoring guidance of a re-search which directs turning at intersection P1 toward intersection C2. As further illustrated by the arrow in FIG. 12, the vehicle departs from the original guidance route a second time at the intersection C3 by turning toward intersection P2, continues through the intersections P3 and C5, while ignoring guidance directing return by a route from intersection P2 to intersection C4, and at intersection C5 departs from the original route a third time. In this way, in certain cases where the vehicle departs from a predetermined route at a series of intersections, either by turning or running straightforward at those intersections in a manner contrary to the route guidance, it may be assumed that the predetermined route is inconsistent with the driver's preferences. In such a case, a full-range route search should be executed. In order to provide proper guidance in such a situation, it is preferable that the apparatus be designed in a way such that the full-range route search is effectuated when a predetermined number of successive off-route events take place, which number may be an appropriate value as selected from a range of from 2 to 10. Additionally, in cases where such off-route events occur frequently, the apparatus may also be designed so that certain types of off-route events, e.g. in the nature of vehicle turns, are weighted differently from other types of off-route events, e.g. straightforward travel through intersections, the weight given the former being, for example, half that of the latter, to trigger the full-range route search when the total weighted value of off-route events reaches a specified value.

In the example described above, the limited (peripheral or local area) route search is replaced with a full-range route search only when it is judged that the driver has intentionally driven his or her vehicle off of the presently recommended guidance route and, therefore, the full-range route search is not carried out unnecessarily. On the other hand, since mere repetitive execution of only limited local route searches is avoided, it is possible to provide adequate guidance consistent with the driver's intentions while at the same time enabling reduction of the time required for search execution.

As has been described above, in accordance with principles of the present invention, the vehicle navigation apparatus is specifically designed so that it judges when a vehicle driver has no intention to return to an initial route when his or her vehicle goes straight through one or more intersections where current guidance directs a turn, and then executes a full-range search for a new route to the destination in accordance with that judgement. Consequently, it becomes possible to selectively make use of either the limited, local area route search or the full-range route search, successfully, upon occurrence of off-route events, which may in turn reduce search time duration while simultaneously providing adequate route guidance that is consistent with the driver's intention.

A method of displaying landmarks of a plurality of genres in accordance with the present invention will now be explained. In cases where landmarks are displayed on a guidance map as additional information, including genre such as gas stations, convenience stores, banks, and the like, simply displaying such landmarks on a map might reduce overall visual recognizability of the map display. Accordingly, in the present invention, the navigation apparatus is designed such that when landmarks are displayed, certain limitations are imposed on the information to be displayed in conformity with actual conditions, thereby avoiding a decrease in visual recognizability. As such conditions or criteria, a variety of parameters is available, including the number of landmarks within the range of the guidance map display, the relative priority of genres as assigned by the vehicle driver, the display scale of the map, the vehicle traveling speed, the travel direction, the category of road along which the vehicle is presently travelling, the day of the week, and the like.

First of all, one exemplary case will be explained in which an upper limit (100, for example) is set for the total number of landmarks to be displayed on a single screen with order of priority being assigned to the genres displayed within the set range. By way of example, in the guidance map screen of FIG. 13(a), the display image will be changed to the selection screen shown in FIG. 14 upon activation of the menu button of a remote controller, or alternatively, a corresponding portion of the screen where a menu is being displayed.

Figure 14:
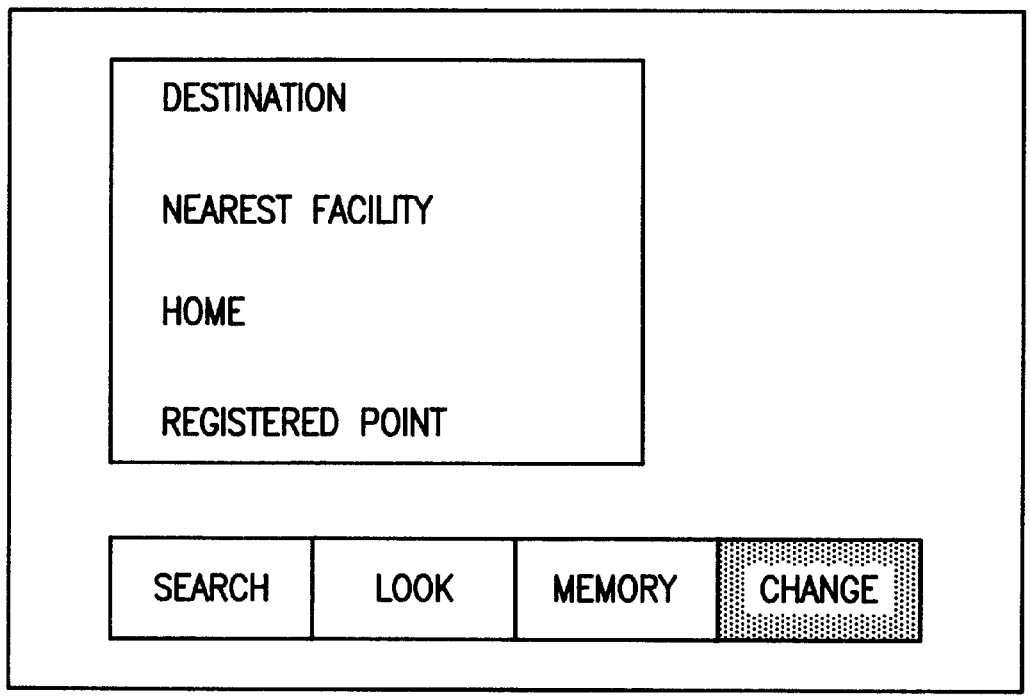
FIG. 14 is a diagram of a selection screen.
Figure 15:
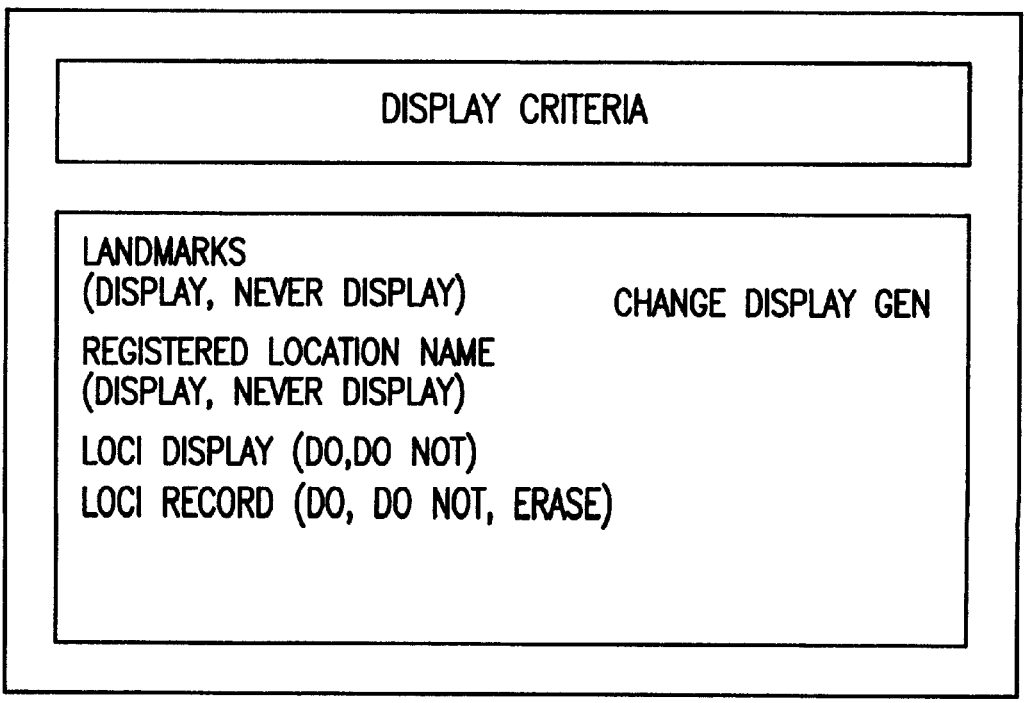
FIG. 15 is a diagram of a screen for setting display criteria.
Figure 16:
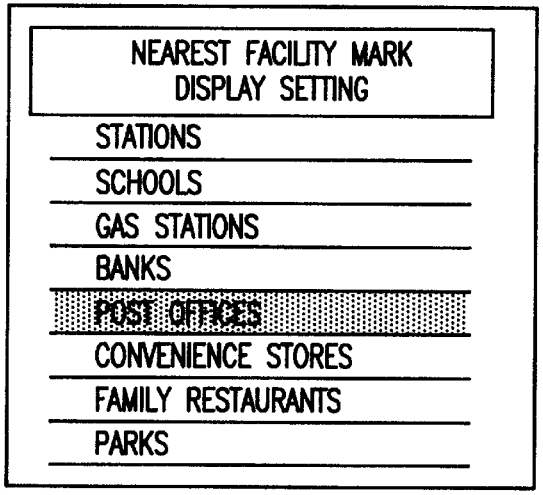
FIG. 16 is a diagram of a screen for use in setting display of the nearest landmark.
Figure 17:
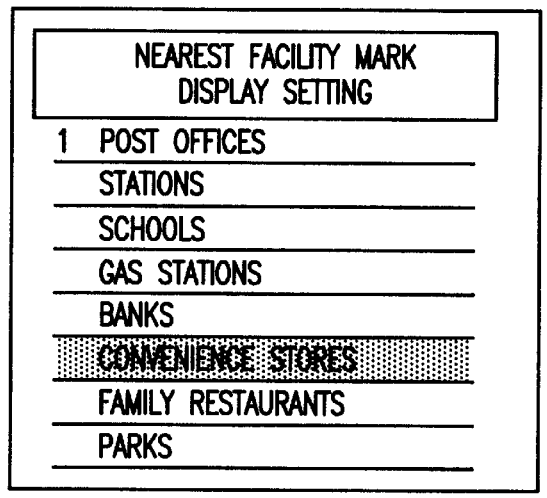
FIG. 17 is a diagram of the screen of FIG. 16 with the newly assigned priority of the genres being displayed.

In the screen shown in FIG. 14, the several input "buttons" displayed at the lower part of the screen include: SEARCH (searching for another route), SEE (confirming), STORE (registering), and CHANGE (changing display criteria). If "CHANGE" is selected, the display is changed to a display a criteria selection screen as shown in FIG. 15. Indicated on this screen are certain display criteria for landmarks, registered-location names, loci displays, and loci records. Here, when one item highlighted as "CHANGE DISPLAY GENRE" is selected, the screen will be changed to a nearest mark display setting screen as shown in FIG. 16. Displayed on this screen are multiple genres such as stations, schools, gas stations, banks, post offices, convenience stores, family restaurants, public parks, and the like. Here, when a cursor is moved at the "POST OFFICES" indicator in FIG. 16, with an appropriate button clicked, the "POST OFFICES" genre is moved to the uppermost position and assigned priority order number "1" as shown in FIG. 17, with its characters being displayed there in a different color.

Figure 18A:
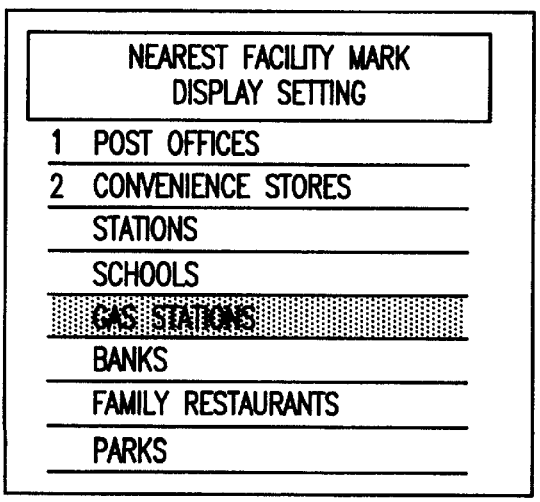
FIGS. 18A and 18B illustrate successive screens with a further change of priority of genres being displayed.
Figure 18B:
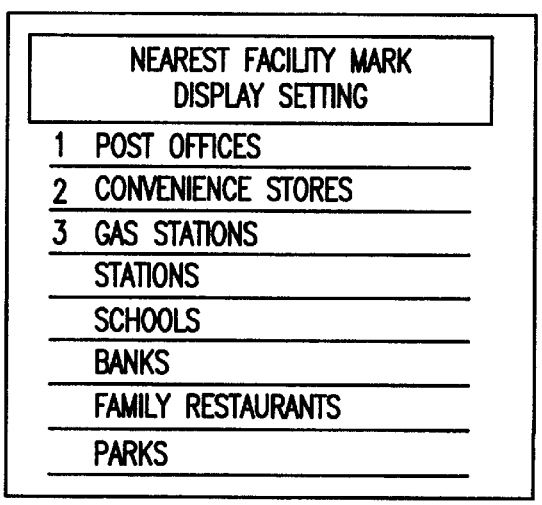

Subsequently, when the "CONVENIENCE STORES" line, for example, is selected (FIG. 17), this category (genre) is moved to the second position in the list with its characters changed in color, and is assigned priority order number "2" as shown in FIG. 18(a). Further, when the "GAS STATIONS" indicator is selected, this category is displayed at the third level in the same list with its character color changed, and is assigned priority order number "3" as shown in FIG. 18(b).

Figure 13A:
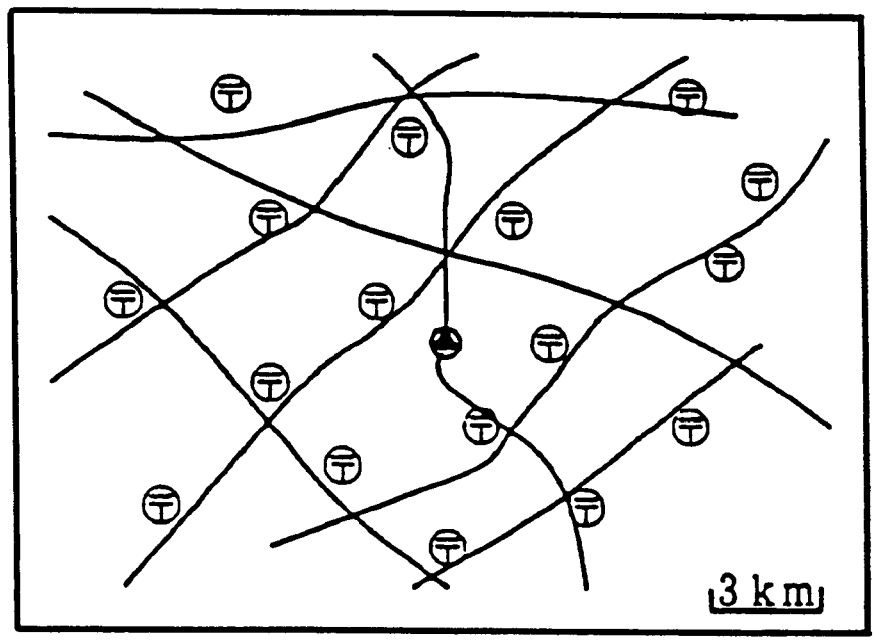
FIG. 13 is a diagram of a guidance screen displaying landmarks.
Figure 13B:
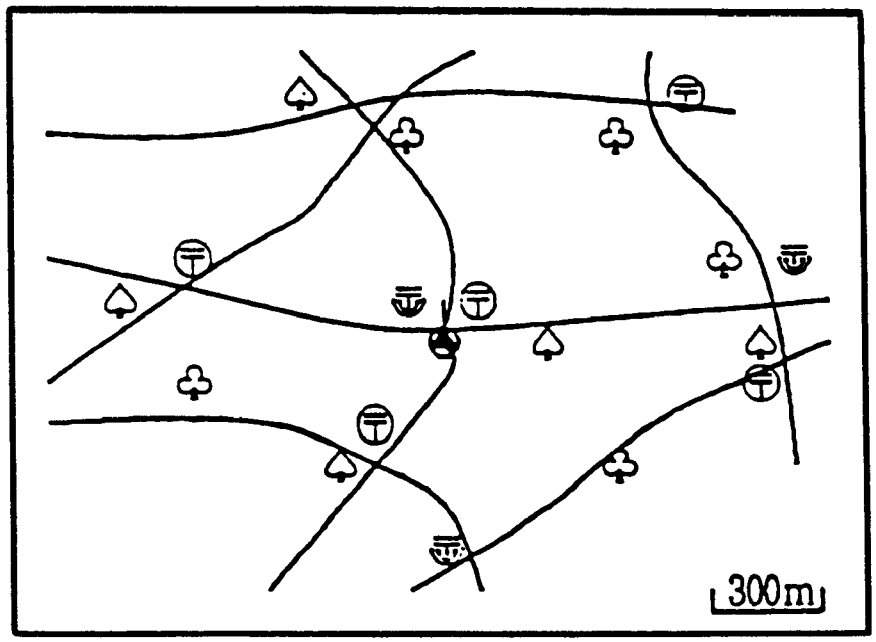

By setting an upper limit for the number of landmarks to be displayed and by setting the order of priority for the genres displayed in the manner described above, it becomes possible that post-office landmarks alone will meet the upper limit for the wide-area scale screen shown in FIG. 13(a), and that the remaining landmarks will not be displayed on that screen, but that other landmarks will be displayed, in addition to the post-office landmarks, when the screen changed to an enlarged scale shown in FIG. 13(b).

Figure 19A:
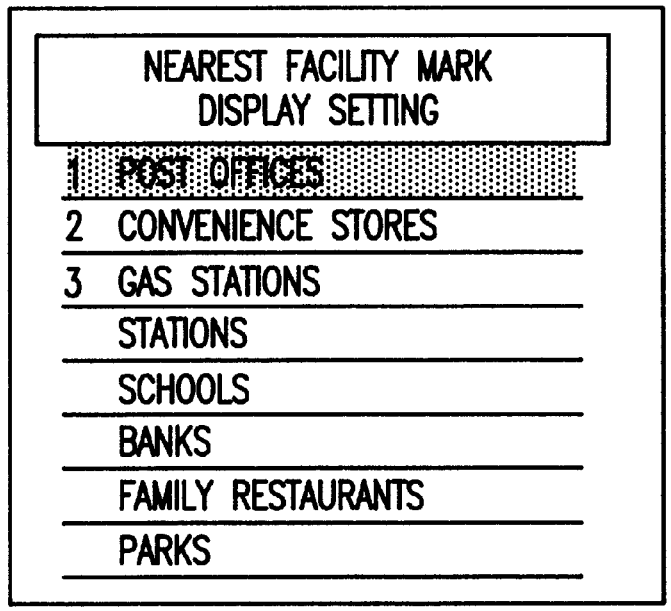
FIGS. 19A and 19B illustrate a further succession of screens with change of landmark genre priority.
Figure 19B:
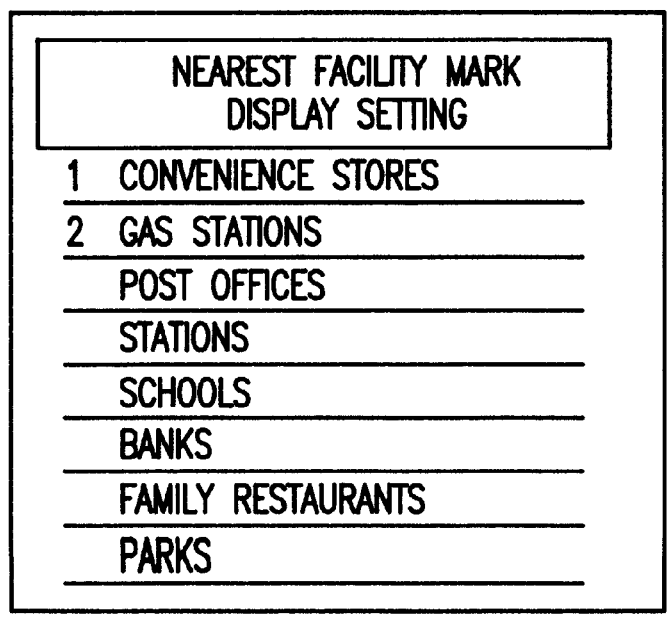

When a genre previously assigned for display is desired to be later changed to a non-display genre—by way of example, when the indication of "POST OFFICES" is to be erased—in FIG. 19(a), the cursor is moved to the post-office indicator in first priority order position and clicked, with the result that the "POST OFFICES" genre is now listed below the display genre as shown in FIG. 19(b) and the genres previously in the second and third priority positions are shifted upwardly into the first and second priority positions, respectively. Also, upon movement of the cursor to a genre with no priority order assigned thereto while pressing an assigned button for a specified time period (three seconds, for example), that genre will be changed to a display genre (a genre to be displayed) with assignment to the uppermost priority. Additionally, the setting procedure will be improved in efficiency if the system is designed for setting of such order of priority with a self-study function whereby those genre with the greatest number of assignments as display genre are displayed at the upper positions on the list on the display screen.

A routine will now be explained with reference to FIG. 20 for a hypothetical case where a hundred landmarks are to be superimposed onto a road map displayed on a single screen with the genres thereof being added in an order of priority. When the display area is changed as the vehicle travels, or alternatively, when the map scale is changed, the display genre facility number within such map coverage is likewise changed causing the number of landmarks to be displayed to vary accordingly. In view of this, first of all, at step 111, the routine judges if the coordinates of a display map center or map scale is changed. If no changes are found (step 111N), then the present display is kept as is since the landmarks to be displayed are not changed. On the other hand, if either the coordinates of a display map center or map scale are changed (step 111Y), then the routine calculates a map display range based on the new scale (range in the screen coordinates of such map) (step 112), thus setting the display landmark registered number as N=0 (step 113). Next, in the manner as has been described previously in conjunction with FIGS. 16–19, specific genre numbers are set with relatively higher orders of priority (step 114), and then a within-the-display range number n is calculated from among certain landmarks having the set genre number (step 115). For example, when the priority is "1 post offices,"

"2—convenience stores," and "3—gas stations" as shown in FIG. 18, n=30 if the number of post-offices is 30. Next, the routine judges whether n+N>100 (step 116). In this example, since n+N=30, any post offices falling within the display range are added to the display list, letting the value of n+N equal N (steps 117, 118). Next, where the processing is not completed with respect to all the display-ON genres (genres to be displayed), the routine selects the genre with the next highest priority and repeats the steps following from step 115 (through steps 119 and 120). In the example of FIG. 18, the second highest priority is assigned to convenience stores; if the within-the-display range number is 60 then let n+N= 90. This means that the resulting value is yet less than 100. Accordingly, it is still permissible to add to the display list any convenience stores within the display range. Furthermore, the third highest priority is assigned to gas stations; if the within-the-display range number is 50 then n+N=50+90=140, so that the resulting value has exceeded 100. At this time, at step 121, the routine calculates the distance between each of the landmarks within the assigned genre number (e.g. gas station landmarks) and the map center. Then, those with the shorter distances are added to the "100−N" display list. In this case, N=90 so that only ten, i.e. 100−90=10, of the gas stations which are closest in distance from the post office are added to the display list (step 122). In this way, a map is displayed while at the same time allowing the 100 landmarks to be added to the display list and displayed on the map (step 122, 123). Note here that in a case where the total number of such landmarks with assigned genre numbers within the display range is less than 100, the map will be displayed at the step where the processing is completed with respect to all the display-ON genres which have been set at step 119. Also, in the case of displaying landmarks, it can happen that close landmarks will visually overlap each other on the screen and, in this case, in order to retain visual recognizability of the landmarks of most interest (having the highest priority), those landmarks of less interest having lower priority are first drawn or depicted with landmarks of higher priority then overwritten on them to ensure that the landmarks of the highest priority order are last depicted.

It should be noted that while in the foregoing embodiment the upper limit for the on-a-single-screen displayable landmark number was set at 100, the present invention is not exclusively limited thereto. The embodiment may, in the alternative, be modified in the manner shown in FIG. 21, wherein a table is prepared in advance, which table contains a variety of upper limit values for later selection of any one among them. In FIG. 21, it is shown that one specific upper limit value "100" is set.

Figures 20, 21:
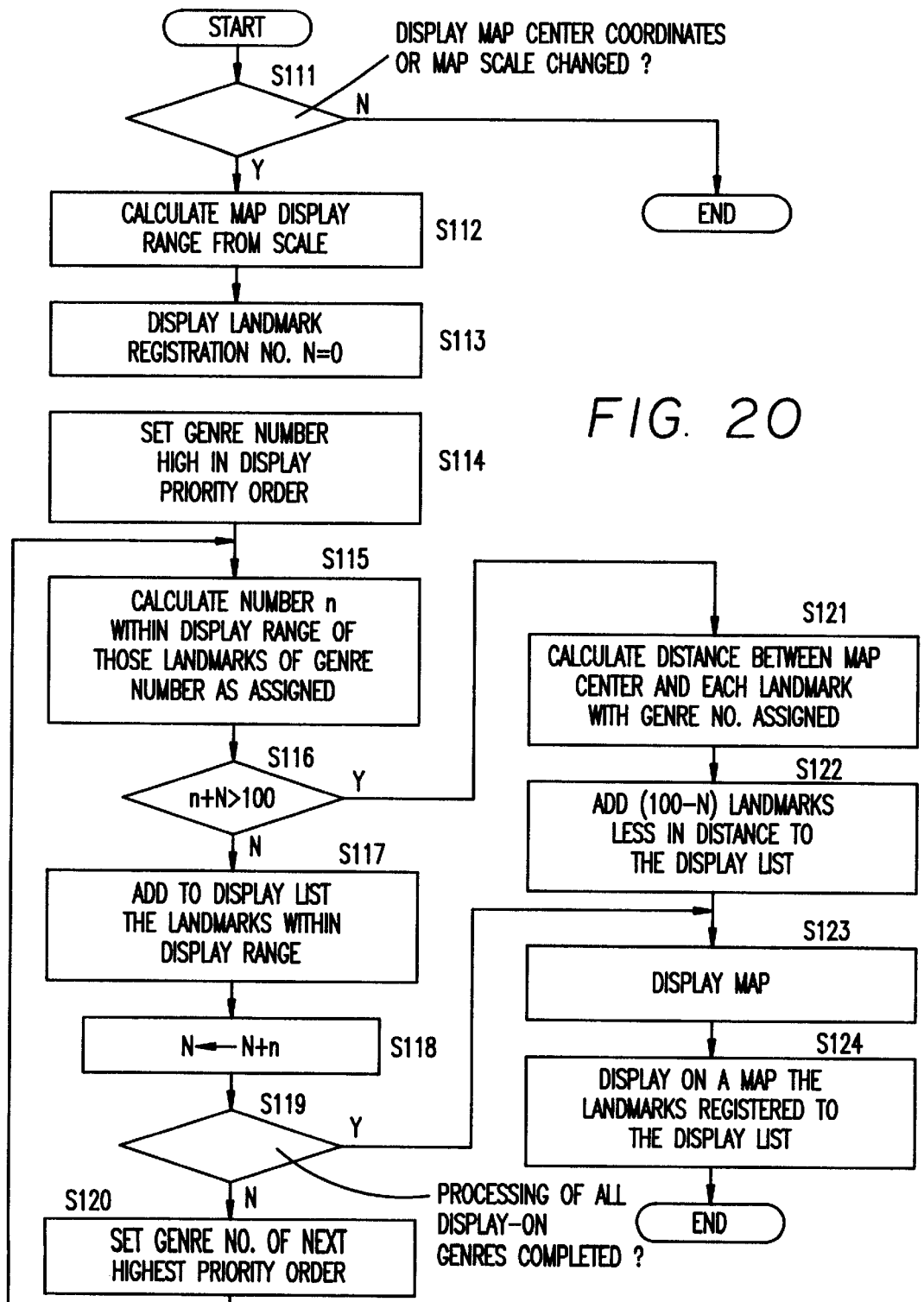
FIG. 20 is a flow chart of a landmark display subroutine for a plurality of genres in accordance with the present invention.
FIG. 21 is an upper limit value table of landmark display.

Also, in the alternative of the upper limit value(s) as displayed in FIG. 21, the apparatus may be designed to set a display range first and then perform a search for display with respect to this limited display range.

It is also possible to arrange the apparatus in a way such that the prescribed upper limit value is variable depending upon the actual map display scale (reduced scale), vehicle travel speed, travel direction, and the like.

By way of example, as shown in FIG. 22(*a*), the landmark display upper limit values are set at 110, 100, 80, . . . 50 corresponding to reduced scales of 1/500, 1/1000, 1/5000, . . . 1/100000. Alternatively, with regard to the vehicle speed, the landmark display upper limit values may be set to 100, 90, 80, 70, 60, 50, 40 for corresponding vehicle speeds of 0 km/hr, 0–30 km/hr, 30–50 km/hr, 50–70 km/hr, 70–80 km/hr, 80–100 km/hr, and greater than 100 km/hr, respectively. Alternatively, the range displayed within a screen may remain modifiable in accordance with the vehicle speed; for instance, to permit displaying of landmarks within the full range of a display screen when the vehicle speed is less than or equal to 40 km/hr, and to erase some landmarks falling within a 300-km range around the present vehicle location when the vehicle speed is greater than or equal to 60 km/hr, thereby enabling successful acquisition of road information with higher priorities during traveling. In yet another alternative, as shown in FIG. 22(*c*), a direction-dependent display distribution scheme is employed wherein the display for travel forward from the present position is set at 60% of the upper limit value, in the manner shown in FIG. 21, 22(*a*) or 22(*b*), display to the right and left is set at 30% thereof, and display of the area to the rear is set at 10%, in a manner independent of the vehicle travel direction. It is also advantageous, that where a route is predetermined, to display only landmarks which are along that predetermined route. Especially, depending upon combinations with the upper limit values for display, it is possible that, while a facility of interest to the driver does exist at a certain location which the vehicle is approaching, such facility will not be displayed due to the fact that too many such facilities (or landmarks) are displayed for the area to the rear of the vehicle present location. If this is the case, giving the top or greater priority to landmarks located on the route in advance of the vehicle present location may better enable the vehicle driver to obtain necessary information in advance.

Furthermore, as an alternative to the combination with the above-mentioned genre priorities described above, the landmark display upper limit values may be combined with one or more of the following parameters: the map display scale, vehicle speed, travel direction, type of road currently travelled, and day of the week.

For example, correlated with the map scale or the order of priority, a hundred landmarks with higher orders of priority from the upper limit may be output at a scale of 1/100. At a 1/500scale, those with higher priorities are extracted; when the resulting number exceeds the upper limit of "100," then the upper limit for number of landmarks to be displayed is changed to permit display of only those landmarks assigned to priority levels for which the total number of landmarks is not in excess of the upper limit. By way of example, in a case where 87 landmarks are found through the second level of priority, and extraction of landmarks at the third order of priority would cause resultant number to go beyond 100, the upper limit for landmarks is set at 87, with display of only those landmarks of the first and second priorities. On the other hand where, for example, the number of landmarks with the first order of priority is greater than 100, e.g. 115, the upper limit would be changed to 115.

Where the vehicle is traveling on a highway, information for facilities other than those along the highway has less meaning; in such a case, a search may be conducted to generate a display limited to the nearby area along the highway, with the display landmark number criterion being deleted.

Thus the present invention avoids the prior art problem of a display screen cluttered with landmark symbols to the extent of obscuring the display, and provides improved visibility of map display notwithstanding imposition of a number of landmarks thereon. As is apparent from the foregoing description, one or a plurality of genres of landmarks are selected by an operator, e.g. driver, for display on a guidance screen—or erased with control of the number and types of landmarks to be displayed on the basis of specified criteria. Accordingly, it becomes possible to prevent the original map from being difficult to see, thus improving the visual recognizability. It is also possible to obtain a selectable landmark presentation, e.g. for a larger scale display a plurality of genres of landmarks near a present vehicle position may be displayed whereas, for a wide area scale, a great number of landmarks with more than one assigned genre are displayed.

The entire disclosure of Japanese Application No. Hei 8-258714 filed Sep. 30, 1996 and Japanese Application No. Hei. 8-259889 filed Sep. 30, 1996, inclusive of their specifications, drawings and abstracts are incorporated herein by reference.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed:

1. A vehicle navigation apparatus for providing guidance comprising:

search means for searching to predetermine a route to a destination from a starting location or a present position;

off-route recognition means for recognizing deviations of the vehicle from current guidance;

selecting means for selecting between a re-search, in a first mode, of road data limited to a limited area closely surrounding a detected present position of the vehicle to determine a return route for return to the predetermined route and, responsive to a predetermined plural number of said deviations, a re-search in a second mode of second road data covering a wide area greater than said limited area, said wide area extending from the detected present position to the destination, to determine a new route from the detected present position to the destination;

re-search means for conducting a re-search in the mode selected by said selection means; and guidance means for outputting guidance in accordance with the predetermined route, the return route and the new route.

2. The vehicle navigation apparatus of claim 1 wherein said selecting means selects the said second mode for re-search responsive to successive deviations from guidance for the return route.

3. The vehicle navigation system of claim 1 wherein said selecting means first selects said first mode for re-search responsive to a deviation from guidance for the predetermined route and subsequently selects said second mode for re-search, responsive to a predetermined plural number of deviations from guidance for the return route.

4. A vehicle navigation apparatus comprising:

present position detection means for detecting a present position of the vehicle;

search means for searching to predetermine a route to a destination from a starting location or the detected present position;

off-route recognition means for recognizing a condition wherein the vehicle has deviated from current guidance;

off-route criterion judgement means for judging whether or not the recognized condition satisfies a predetermined criterion;

selecting means for selecting, in accordance with said judgement, between a re-search in a first mode of road data limited to a limited area closely surrounding a detected present position of the vehicle to determine a return route for return to the predetermined route and a re-search in a second mode of second road data covering a wide area greater than said limited area, said wide area extending from the detected present position to the destination, to determine a new route from the detected present position to the destination;

re-search means for conducting a re-search in the mode selected by said selection means; and guidance means for outputting guidance in accordance with the predetermined route, the return route and the new route.

5. The vehicle navigation apparatus of claim 4 wherein said predetermined criterion is that a road the vehicle is travelling in the detected present position is a search-executable road.

6. The vehicle navigation apparatus of claim 4 wherein said predetermined criterion is a predetermined number of successive deviations from guidance for the return route and wherein a re-search in said second mode is conducted responsive to a judgement that the criterion has been satisfied.

7. The vehicle navigation apparatus of claim 4 wherein said predetermined criterion is travel in a direction contrary to directions given in said guidance for said return route.

8. The vehicle navigation apparatus of claim 4 wherein said predetermined criterion is passage straight through an intersection contrary to guidance giving directions for a turn at said intersection.

9. A storage medium having encoded thereon a program for execution of a routine comprising:

searching to predetermine a route to a destination from a starting location or a present position;

recognizing a condition wherein the vehicle has deviated from current guidance;

judging whether or not the recognized condition satisfies a predetermined criterion;

selecting, in accordance with said judgement, between a re-search in a first mode of road data limited to a limited area closely surrounding a detected present position of the vehicle to determine a return route for return to the predetermined route and a re-search in a second mode of second road data covering a wide area greater than said limited area, said wide area extending from the detected present position to the destination, to determine a new route from the detected present position to the destination;

conducting a re-search in the mode selected by said selection means; and outputting guidance in accordance with the predetermined route, the return route and the new route.

10. The storage medium as recited in claim 9, wherein said predetermined criterion is that the vehicle has gone straight through an intersection contrary to guidance instructing a turn.

11. The storage medium as recited in claim 9, wherein said predetermined condition is that a road travelled by the vehicle in the detected present position is a search-executable road.

12. The storage medium as recited in claim 9, wherein said predetermined criterion is that a predetermined number of plural deviations from guidance for the return route have occurred in succession; and wherein a re-search in the second mode is selected responsive to a positive judgement.

* * * * *